United States Patent [19]

Brandenburg et al.

[11] Patent Number: 4,582,454
[45] Date of Patent: Apr. 15, 1986

[54] APPARATUS AND METHOD FOR FEEDING PULVERIZED COAL INTO AN AIR LINE TO A BLAST FURNACE

[75] Inventors: Jan H. Brandenburg, Heemstede; Johannes J. M. Cornelissen, Heerhugowaard, both of Netherlands

[73] Assignee: Hoogovens Groep B.V., Ijmuiden, Netherlands

[21] Appl. No.: 566,729

[22] Filed: Dec. 29, 1983

[30] Foreign Application Priority Data

Jan. 12, 1983 [NL] Netherlands ............ 8300098

[51] Int. Cl.$^4$ ............................................. B65G 53/66
[52] U.S. Cl. ............................................. 406/32; 177/128; 177/50; 110/104 R; 406/24
[58] Field of Search ............... 406/32, 24, 181; 177/128, 50; 110/104

[56] References Cited

U.S. PATENT DOCUMENTS

| 3,689,045 | 9/1972 | Coulter et al. ........... 406/24 X |
| 4,004,647 | 1/1977 | Forst et al. ............. 177/128 |
| 4,027,920 | 6/1977 | Wennerstrom ........... 406/181 |

FOREIGN PATENT DOCUMENTS

| 0059904 | 9/1982 | European Pat. Off. ....... 177/128 |
| 2105733 | 8/1972 | Fed. Rep. of Germany ... 177/132 |
| 2612899 | 9/1977 | Fed. Rep. of Germany ... 177/128 |
| 2648939 | 5/1978 | Fed. Rep. of Germany ... 177/128 |
| 2703736 | 8/1978 | Fed. Rep. of Germany ... 177/128 |
| 2714355 | 10/1978 | Fed. Rep. of Germany ... 177/128 |
| 2504152 | 10/1982 | France ................. 177/862.54 |
| 58-2525 | 1/1983 | Japan .................... 177/132 |
| 58-2130 | 1/1983 | Japan .................... 177/132 |
| 81581 | 8/1979 | Luxembourg ........... 177/128 |
| 2106064 | 4/1983 | United Kingdom ...... 177/128 |

Primary Examiner—Jeffrey V. Nase
Assistant Examiner—L. E. Williams
Attorney, Agent, or Firm—Stevens, Davis, Miller & Mosher

[57] ABSTRACT

Pulverized coal feed tanks are emptied in sequence via a transport line into the hot blast of a blast furnace. Each tank is carried by three load cells whose outputs are summed and differentiated to obtain the actual feed rate. Gas pressure in the tank is controlled in dependence on the actual feed rate so as to achieve a desired feed rate. To reduce the possibility of inaccurate feeding of coal, the outputs of the respective load cells are compared, and if deviation from a predetermined weight distribution over the load cells is detected, feed from the tank is stopped. The load cells may be duplicated in series, and the summed outputs of the two sets of load cells compared to detect malfunctioning of a load cell, again resulting in cessation of feeding from that tank.

5 Claims, 4 Drawing Figures

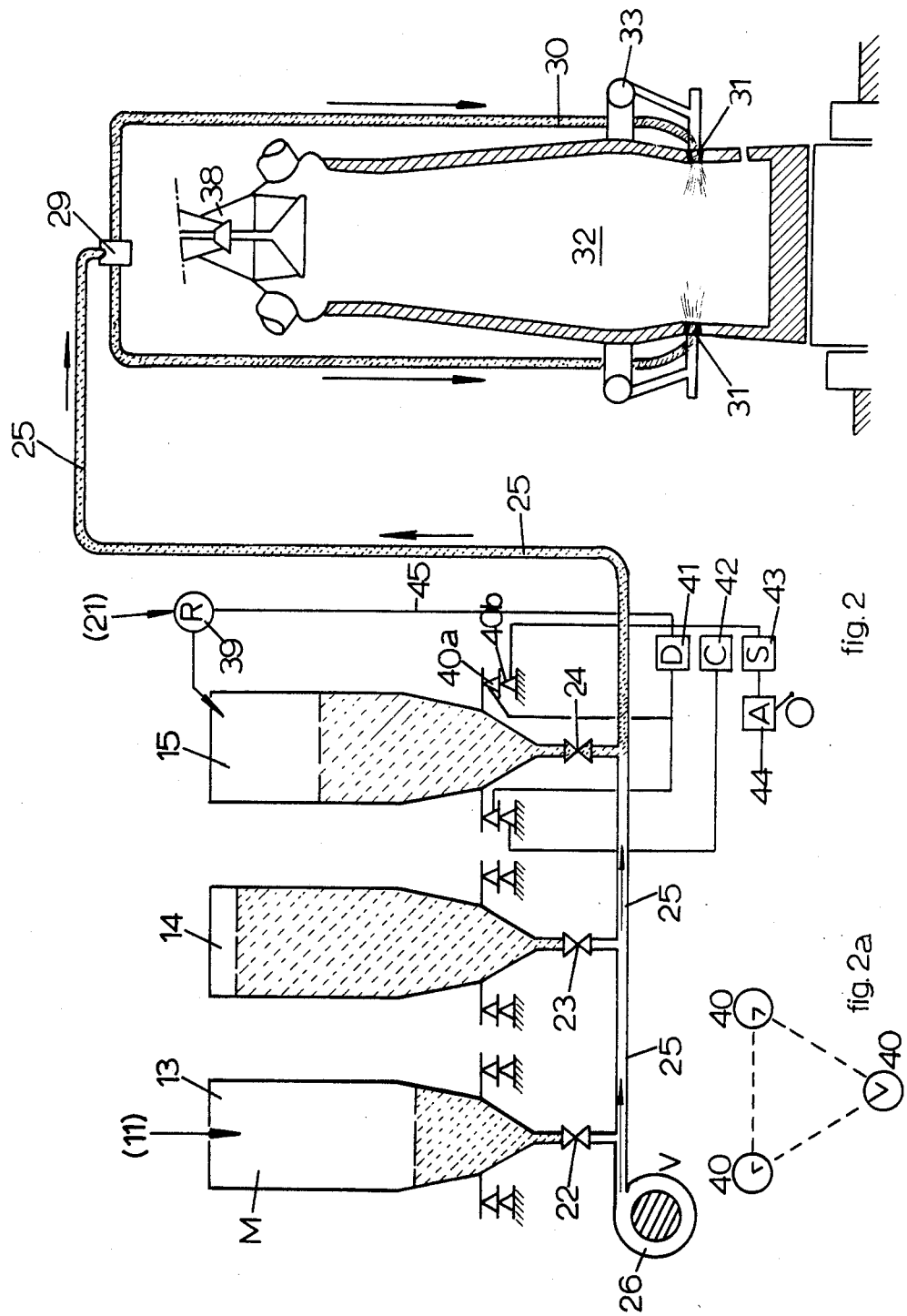

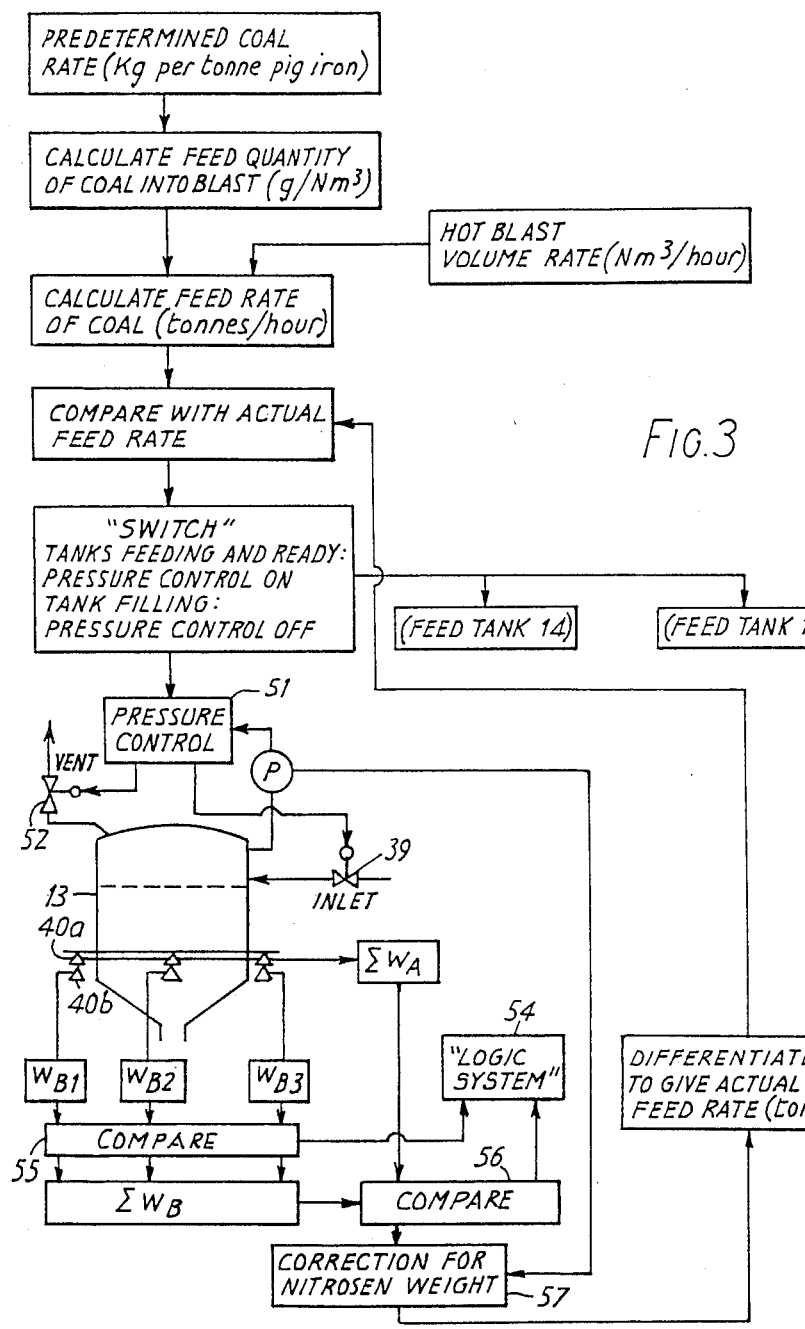

APPARATUS AND METHOD FOR FEEDING PULVERIZED COAL INTO AN AIR LINE TO A BLAST FURNACE

BACKGROUND OF THE INVENTION

1. Field of the Invention

The invention relates to apparatus for feeding pulverised coal into an air line to a blast furnac, and a method of feeding pulverised coal using such apparatus. The apparatus comprises a plurality of feed tanks for the pulverised coal which are sequentially emptied into the air line and while not being emptied are filled again.

2. Description of the Prior Art

Fuel is fed into the hot blast introduced at the tuyeres of a blast furnace, in order to increase the heat content of the hot blast. Blast furnaces require a large amount of fuel, and therefore a low price fuel should be used. Oil is convenient to inject, but is expensive. Pulverised coal is an alternative but poses many difficulties in handling, particularly in view of its explosive nature in contact with oxygen.

An earlier patent describing a pulverised coal injection system is U.S. Pat. No. 3,306,238, but this does not discuss how the coal injection rate should be controlled. U.S. Pat. No. 3,720,351 discloses a system having three delivery tanks, which are emptied sequentially into the air blast line. Weight measuring transducers are provided to sense the weight of these tanks, and the differential of these weights with respect to time are calculated to provide a measure of the flow rate of coal to the blast furnace.

The use of three delivery tanks, which are generally supplied from a common storage tank, is advantageous, since it allows one tank to be emptying into the air blast line, one tank to be filling, and one tank to be in readiness to empty. If one of the tanks must be taken out of service for repair or maintainence, the remaining two tanks can still maintain a constant delivery though with no security against failure of one of them.

EP-A No. 0 059 904 also describes a system of feeding coal into metallurgical furnaces in which the weight of a feed tank is measured and differentiated with respect to time to give a flow rate.

In modern blast furnace practice, it is considered important to maintain an accurately controlled flow of the fuel into the air blast, and to avoid if possible substantial deviations in this flow rate. The present invention is particularly concerned to provide a control system and method which will increase the precision of the supply of pulverised coal into the air blast.

SUMMARY OF THE INVENTION

The invention is based on the appreciation that it is advantageous to monitor, preferably at very frequent intervals, the outputs of the load cells to detect malfunctioning of the tank and/or the cells. Thus the invention proposes monitoring the weight distribution among the load cells; deviation may be due to a failure of one load cell, or to actual deviation of the partial weights carried by the respective load cells. In either case, the differential of the total weight with respect to time may well no longer be an accurate measure of flow rate. In a preferred embodiment, each load cell unit is a pair of load cells and the outputs of the two sets of cells thus provided are compared, in order to detect failure of a load cell.

The invention lends itself well to the monitoring and control of the feed apparatus by programmed data processing means.

U.S. Pat. No. 4,004,647 discloses a pulverised coal feed system in which load cell units each consisting of two cells are used to weigh a reservoir tank to ensure a desired level of coal therein. The two independent sets of load cells are used one at a time.

BRIEF INTRODUCTION OF THE DRAWINGS

The preferred embodiment of the present invention will now be described, by way of non-limitative example, with reference to the accompanying drawings, in which;

FIG. 1 is a general diagram of apparatus for preparing and feeding pulverised coal into a blast furnace, FIG. 2 is a view of parts of the apparatus of FIG. 1, showing the application of the present invention, FIG. 2a shows the cell units arranged at the apices of an equilateral triangle, and FIG. 3 is a block diagram indicating the control steps performed by the apparatus and method of the invention in this embodiment.

DESCRIPTION OF THE PREFERRED EMBODIMENTS

Figure 1:
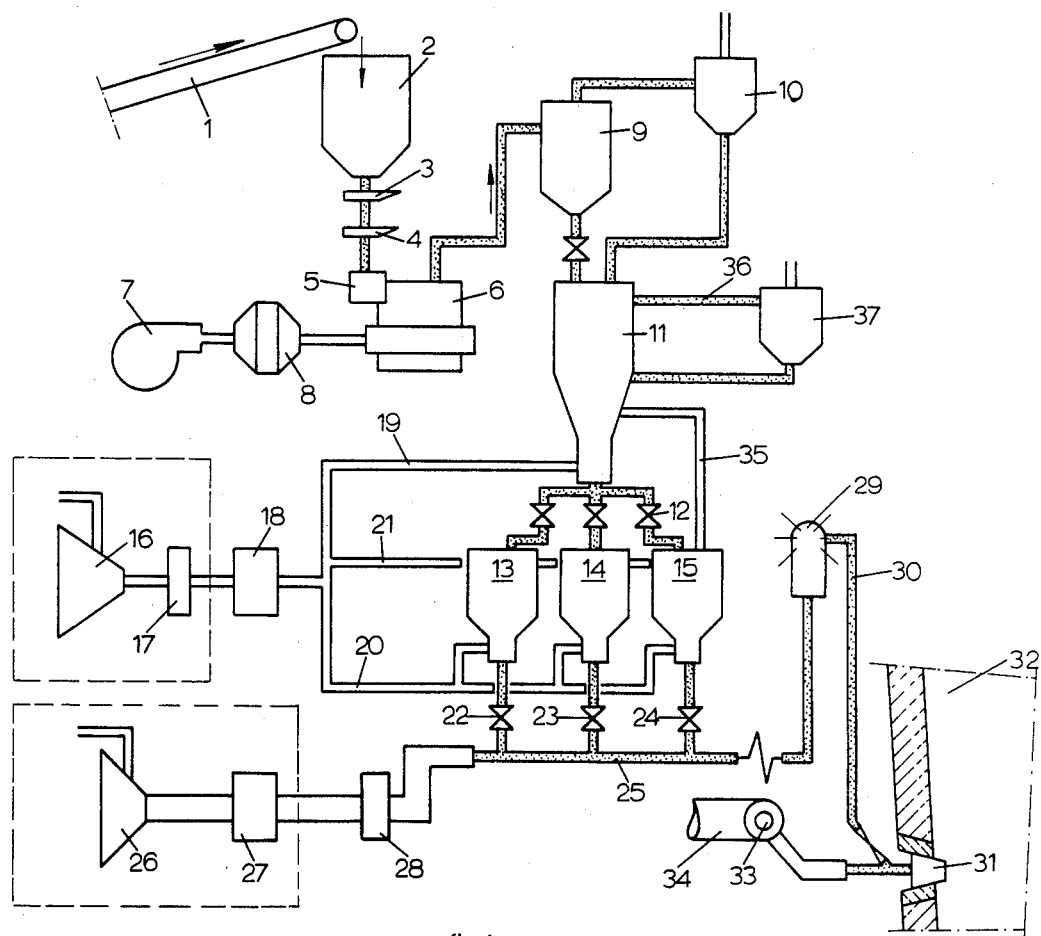

FIG. 1 shows the coal injection system in broad outline, omitting control equipment, valves and safety devices.

Pit coal (i.e. hard coal or stone coal) is conveyed by a belt 1 into a coal bunker 2, and from there passes via two slide gates 3,4, which act in the manner of a lock, and a controlled rate feed belt 5 into a pulveriser 6. The very finely crushed pulverised coal from the pulveriser 6 is conveyed by means of a blower 7 and an air heater 8 to the cyclone 9. The hot air is released into the atmosphere via a filter 10, the pulverised coal collected by the cyclone 9 and by the filter 10 is stored in a main storage bunker 11.

The pulverised coal from the main storage bunker 11 is fed via controlled valves 12 into three identical feed tanks 13,14,15. In the bunker 11 and the tanks 13,14,15, pulverised coal is, while the system is in operation, kept in a fluidised state by means of an inert gas, specifically nitrogen. The nitrogen is derived from an air separation installation, not shown, and is pressurized to 18 bar by a compressor 16, cooled by a cooler 17 and stored in a receiver 18. From the receiver 18 a line 19 runs to the lower end of the bunker 11 to provide fluidising gas for that bunker, a line 20 supplies fluidising gas to the lower end of each of the feed tanks 13,14,15, and a line 21 is connected, via control valves not shown but described later, to the top of each of the tanks 13,14,15 to control the pressure in the tanks, as described below.

The coal is admitted into a transport line 25 via respective control valves 22,23 or 24 from the feed tanks 13,14,15. Compressed air, brought to a pressure 15 bar by the compressor 26, cooled in a cooler 27 and stored in a receiver 28, flows along the transport line 25 to a distributor 29 located above the blast furnace. In the distributor 29, the air and the entrained pulverised coal are distributed uniformly to a plurality of feed lines 30 connected to the respective tuyeres 31 of the blast furnace 32. Each tuyere 31 is connected in the usual manner to a hot blast ring main 33 which is fed from hot blast stoves not shown by a hot blast main 34.

Nitrogen can be vented from each tank 13,14,15 via a line 35 (shown only for tank 15) which runs to the storage bunker 11. Nitrogen is vented from the bunker 11 to the atmosphere via a line 36 and a filter 37. The control of venting of the feed tanks 13,14,15 will be described in more detail below.

FIG. 2 shows the feed or delivery tanks 13,14,15, the feed lines to the blast furnace and parts of the control system for the feed tanks in more detail, the same reference numerals being used for the same parts as in FIG. 1. FIG. 2 also indicates that the valve 24 of the feed tank 15 is open so that this tank is delivering pulverised coal into the transport line 25 and is therefore emptying. At the same time, the valves 22,23 of the tanks 13,14 are closed. The tank 13 is being filled from the storage bunker 11, while the tank 14 is full and is maintained in readiness to deliver coal on the opening of the valve 23 immediately that the tank 15 reaches its empty level or the tank 15 is taken out of service because of a failure. As mentioned, coal in the tanks is kept in a permanently fluidised condition. Furthermore, nitrogen under pressure is supplied into the top of the tanks 13,14 and 15, via the line 21 mentioned above, under control of an inlet controller 39, whose operation is described in more detail below.

The tanks 13,14,15 are emptied and refilled sequentially. The sequence need not be regular. For example only two tanks may be used, the third being held in readiness or being "out of service".

FIG. 2 also shows diagrammatically how each tank 13,14,15 is carried by load cell units 40, there being in each case three load cell units 40 arranged at the apexes of an equilateral triangle (see FIG. 2a) in a horizontal plane close to the bottom end of the tank. In practice the load cells carry an annular flange which itself carries the feed tank. All connections to the feed tank are made flexible, so that they do not affect the weight of the tank as sensed by the load cells. Each load cell unit 40 consists of two load cells 40a,40b arranged to carry the load of the tank in series, that is to say the two load cells 40a,40b should, if operating correctly, sense the same weight. Furthermore, since the cell units are arranged in an equilateral triangle, they should each also sense the same weight, assuming that the tank is properly balanced so that its centre of gravity is on its central vertical axis.

FIG. 2 shows diagrammatically that the signals from the load cells 40a,40b are fed to a differentiator 41, a comparator 42 and an adder 43. An alarm device 44 is shown attached to the adder circuit 43, while the output of the differentiator 41 is shown as connected by line 45 to the control valve arrangement 39 for the admission of nitrogen to the top of the tank. This diagrammatic representation will now be explained more fully by reference to FIG. 3 which illustrates the computational and logical operations carried out by the apparatus.

In practice, the various output signals of the sensing devices of the apparatus and the input signals for desired conditions of the apparatus are fed into programmed data processing means hereinafter called a computer, which carries out the various computations and analyses the state of the coal supply apparatus and provides control signal outputs for control of the apparatus. The arrangement and programming of such a computer need not be described here. Of course, in practice, the computer also provides a monitoring and alarm system for the blast furnace operators. FIG. 3 shows the control system applied to one of the feed tanks only. The same control arrangements and steps are applied to the other feed tanks.

Referring to FIG. 3, the computer has, as input data, the predetermined desired coal feed rate calculated as kilograms per tonne of pig iron to be produced in the blast furnace. From this it calculates the feed quantity of coal into the hot blast, in grammes per unit volume of the hot blast. Then, using the hot blast volume supply rate which is also input, it calculates the appropriate feed rate of coal, in tonnes per hour, from the tanks 13,14,15. This desired feed rate is compared with the actual feed rate which is obtained by differentiation of an adjusted weight signal from the load cells, as described in more detail below. The result of the comparison is converted into a control signal for the nitrogen pressure applied at the tops of the tanks 13,14,15, via a function designated as "switch" in FIG. 3. The "switch" discriminates between the tank which is being filled to which nitrogen pressure control is not applied, and the tank or tanks which are in a state of either (a) feeding (emptying) into the transport line 25 or (b) full and in a state of readiness to feed, for which the pressure control is on.

The pressure control function, indicated by box 51 in FIG. 3, has the control signal from the switch as an input, and also the actual pressure in the top of the tank as sensed by a sensor P. It compares these inputs and controls the inlet valve 39 for nitrogen input into the tank and the vent valve 52 for venting nitrogen from the tank, in order to bring the actual pressure to the desired pressure so as to achieve the desired feed rate. The tank pressure is thus used to control the feed rate out of the tank.

Turning now to the computations performed on the outputs of the load cells 40a,40b, FIG. 3 indicates that the outputs of the upper set of load cells 40a are fed to the computer and summed to give a total measured weight $\Sigma W_A$. The individual weights sensed by the three lower cells 40b, i.e. $W_{B1}, W_{B2}$, and $W_{B3}$ are fed to the computer where they are compared. If the comparison indicates that they are not equal, a signal is applied to a "logic system" indicated by box 54. $W_{B1}, W_{B2}$ and $W_{B3}$ are summed to provide a sum $\Sigma W_B$ which is compared with $\Sigma W_A$, and the result of the comparison is also fed to the logic system.

Assuming that the comparison indicates that signal WA is equal, within a predetermined tolerance limit, to signal $W_B$, this total weight value for the tank is corrected (box 57) by the computer for the weight of the nitrogen in the tank, this weight being calculated from the pressure in the tank indicated by the sensor P and from the amount of coal known to be in the tank from the total weight of the tank. This corrected value of the tank weight is differentiated with respect to time to give the actual feed rate (tonnes per hour) from the tank, which as mentioned above is compared with the desired feed rate.

The "logic system" 54 of FIG. 3 will now be described in more detail. Although represented as a separate item in FIG. 3, it is like the other computational and comparison operations illustrated in FIG. 3 carried out by the computer in accordance with the program of the computer and should not be considered as a separate item of apparatus.

The three states which each of the tanks 13,14,15 may have, during operation of the coal supply system, are set out below, together with the corresponding state of the automatic pressure control applied to the tank:

| State of tank | State of pressure control |
|---|---|
| I Out of service or filling to maximum weight | off tank venting |
| II ready for feeding | on |
| III Feeding | on |

By "tank venting" is meant that the pressure control 51 has effected opening of the vent valve so that the pressure in the tank is effectively zero (in practice since the tank is kept fluidised during operation of the system a positive pressure is maintained in the tank, which also avoids the risk of access of oxygen to the tank).

While the tank is in any one of the three states I,II,III, the comparison steps indicated by boxes 55,56 are being carried out at frequent intervals. When the tank is in state I the corrected total tank weight is monitored so as to indicate whether the tank has reached its maximum weight level and can be taken to be full. At this point, it is switched to state II, so that the automatic pressure control is put "on", and consequently the pressure in the tank is maintained constantly at the appropriate pressure for delivering coal from the tank at the desired rate into the transport line 25, even though at this time the tank is not actually delivering; thus the tank is maintained in readiness to begin to deliver immediately. Similarly, the corrected weight for the emptying tank (state III) is monitored, so that when it reaches a predetermined minimum weight, indicating emptiness (of course, the tank is not totally empty) it is immediately switched to state I, and the tank (or one of the tanks) in state II is switched into state III, allowing uninterrupted flow of coal at the desired flow rate into the hot blast.

Because of the importance of ensuring that a continued flow of coal at the desired feed rate is maintained, the "logic system" continually performs the comparisons indicated by boxes 55,56 and switches the tank concerned into state I (out of service) when the comparisons 55 indicates that the measured weights at the three load cell units are not equal or when the comparison 56 indicates that the total weight is summed by the load cells 40a is not equal to the total weights summed by the load cells 40b. Different weights sensed at the three load cells units (comparison 55) may be due to failure of one of the load cells or, less likely, an abnormality in the state of filling of the tank, e.g. non uniform coal distribution in the tank or, again less likely, a state in which part of the tank weight has been transferred to a support other than the load cells. Deviation between the weights $\Sigma\ W_A$ and $\Sigma\ W_B$ (comparison 56) generally indicates that one of the load cell sets 40a and 40b is malfunctioning. In either case the computer is no longer able to exercise proper control of the flow of coal from the tank by differentiation of the tank weight, and consequently the tank must be taken out of service. This is carried out automatically, by switching the tank to state I and simultaneously switching another tank into state III.

While this invention has been described in detail with reference to one embodiment thereof, it will be appreciated that many variations and other embodiments of the invention are possible within the spirit and scope of the invention as herein claimed.

What is claimed is:

1. Apparatus for feeding pulverised coal into an air line to a blast furnace, comprising a plurality of feed tanks for pulverised coal which is sequence are emptied into the air line and which after emptying are refilled, control means for maintaining the tanks under a pressure of inert gas which during emptying of a said tank is controlled in dependence on the desired flow rate of the pulverized coal into the air line, and for each tank a plurality of load cell units which carry the tank and provide respect output signals the sum of which are a measure of the total weight of the tank and the coal and gas therein, each load cell unit comprising two load cells arranged to carry the load in series, said control means being arranged to control said pressure of inert gas in dependence on the negative derivative of the said sum with respect to time, to compare the output signals from the respective load cell units and detect when the comparison indicates significant deviation of the weight distribution over the load cell units from a desired weight distribution, to compare the sum of the weights detected by a first set of load cells consisting of one cell of each load cell unit which the sum of weights detected by the second set of load cells consisting of the other cell of each load cell unit, to stop the feed of coal from a said tank when a deviating weight distribution is so indicated for that tank to stop the feed of coal from a said tank when the difference between the weight sums of the first and second load cell sets of that tank is greater than a predetermined value.

2. Apparatus according to claim 1 wherein each tank is carried by three said load cell units arranged at the apices of an equilateral triangle.

3. Apparatus according to any one of claims 1 and 2 wherein said control means includes sensing means for sensing the pressure of the inert gas in the tank being emptied and is arranged to correct the sum of the weights detected by the load cell units so as to make allowance for the weight of inert gas in the tank, the value of the sum thus corrected being used in the control of the inert gas pressure in order to achieve the desired feed rate of coal from that tank.

4. Method of feeding pulverised coal into an air line to a blast furnace, wherein a plurality of feed tanks for pulverized coal are emptied in sequence into the air line and after emptying are refilled, the tanks being kept under a pressure of inert gas which during emptying is controlled in dependence on the desired flow rate of the pulverised coal into the air line, and each tank being carried by a plurality of load cell units which provide respective output signals the sum of which are a measure of the total weight of the tank and the coal and gas therein, each load cell unit comprising two load cells arranged to carry the load in series the method comprising the steps of controlling said pressure of inert gas in dependence on the negative derivative of the said sum with respect to time, comparing the output signals from the respective load cell units, detecting when the comparison indicates significant deviation of the weight distribution over the load cell units from a desired weight distribution, comparing the sum of the weight detected by a first set of load cells consisting of one cell of each load unit with the sum of weights detected by second set of load cells consisting of the other cell of each load cell unit stopping the feed of coal from a tank when a deviating weight distribution is so indicated for that tank and stopping the feed of coal from a tank when the difference between the weight sums of the first and second load cells sets of that tank is greater than a predetermined valve.

5. Method according to claim 4 including the step of maintaining the said feed tanks, when filled with coal, in readiness to empty into the air line to the blast furnace, by maintaining the coal in the filled tank under a pressure which is controlled in dependence on the instantaneous desired feed rate into the air line.

* * * * *